US012209314B2

(12) United States Patent
Kaneko

(10) Patent No.: US 12,209,314 B2
(45) Date of Patent: Jan. 28, 2025

(54) SUBSTRATE LIQUID PROCESSING APPARATUS AND SUBSTRATE LIQUID PROCESSING METHOD

(71) Applicant: Tokyo Electron Limited, Tokyo (JP)

(72) Inventor: Satoshi Kaneko, Koshi (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 0 days.

(21) Appl. No.: 17/754,379

(22) PCT Filed: Sep. 23, 2020

(86) PCT No.: PCT/JP2020/035672
§ 371 (c)(1),
(2) Date: Mar. 31, 2022

(87) PCT Pub. No.: WO2021/065589
PCT Pub. Date: Apr. 8, 2021

(65) Prior Publication Data

US 2022/0396882 A1 Dec. 15, 2022

(30) Foreign Application Priority Data

Oct. 2, 2019 (JP) ................................ 2019-182225

(51) Int. Cl.
*C23C 18/16* (2006.01)
*B05C 5/00* (2006.01)

(52) U.S. Cl.
CPC .......... *C23C 18/1676* (2013.01); *B05C 5/001* (2013.01); *C23C 18/1628* (2013.01); *C23C 18/163* (2013.01)

(58) Field of Classification Search
CPC ..... C23C 18/1628–163; C23C 18/1676–1678; B05C 5/001
See application file for complete search history.

(56) References Cited

U.S. PATENT DOCUMENTS

2003/0109205 A1* 6/2003 Sugimoto ......... H01L 21/02052 257/E21.228
2004/0234696 A1* 11/2004 Hongo .............. H01L 21/76874 427/430.1
2018/0002811 A1* 1/2018 Motomatsu ........... C23C 18/163

FOREIGN PATENT DOCUMENTS

JP 2003-129250 A 5/2003
JP 2005-008954 A 1/2005
(Continued)

OTHER PUBLICATIONS

International Search Report for PCT/JP2020/035672 dated Nov. 2, 2020.

*Primary Examiner* — Dah-Wei D. Yuan
*Assistant Examiner* — Stephen A Kitt
(74) *Attorney, Agent, or Firm* — Chrisman Gallo Tochtrop LLC

(57) ABSTRACT

A technique enabling to heat a plating liquid rapidly while suppressing thermal deterioration of the plating liquid is provided. A substrate liquid processing apparatus includes a substrate holder configured to hold a substrate; a plating liquid supply configured to supply the plating liquid on a processing surface of the substrate; and a heating element, configured to heat at least one of the plating liquid on the processing surface or the substrate, including a heater, a liquid flow path through which pure water flows, and a vapor discharge opening which is connected to the liquid flow path and through which water vapor produced as the pure water is vaporized by heat from the heater is ejected.

11 Claims, 6 Drawing Sheets

(56) References Cited

FOREIGN PATENT DOCUMENTS

| | | | | |
|---|---|---|---|---|
| JP | 2013-112843 A | | 6/2013 | |
| JP | 2013-112846 | * | 6/2013 | |
| JP | 2013-112846 A | | 6/2013 | |
| JP | 2018-003097 A | | 1/2018 | |
| WO | WO-2013080781 A1 | * | 6/2013 | ......... C23C 18/1619 |
| WO | 2019/116939 A1 | | 6/2019 | |

* cited by examiner

SUBSTRATE LIQUID PROCESSING APPARATUS AND SUBSTRATE LIQUID PROCESSING METHOD

CROSS-REFERENCE TO RELATED APPLICATIONS

This Application is a U.S. national phase application under 35 U.S.C. § 371 of PCT Application No. PCT/JP2020/035672 filed on Sep. 23, 2020, which claims the benefit of Japanese Patent Application No. 2019-182225 filed on Oct. 2, 2019, the entire disclosures of which are incorporated herein by reference.

TECHNICAL FIELD

The various aspects and embodiments described herein pertain generally to a substrate liquid processing apparatus and a substrate liquid processing method.

BACKGROUND

By heating a plating liquid on a substrate, a plating processing of the substrate can be accelerated.

In an apparatus described in Patent Document 1, for example, a substrate held by a substrate holder is covered by a cover body, and a plating liquid on the substrate is heated by a heater included in the cover body.

Patent Document 1: Japanese Patent Laid-open Publication No. 2018-003097

SUMMARY

In one exemplary embodiment, a substrate liquid processing apparatus includes a substrate holder configured to hold a substrate; a plating liquid supply configured to supply a plating liquid on a processing surface of the substrate; and a heating element, configured to heat at least one of the plating liquid on the processing surface or the substrate, comprising a heater, a liquid flow path through which pure water flows, and a vapor discharge opening which is connected to the liquid flow path and through which water vapor produced as the pure water is vaporized by heat from the heater is ejected.

DETAILED DESCRIPTION

Hereinafter, a substrate liquid processing apparatus and a substrate liquid processing method will be described with reference to accompanying drawings.

Figure 1:
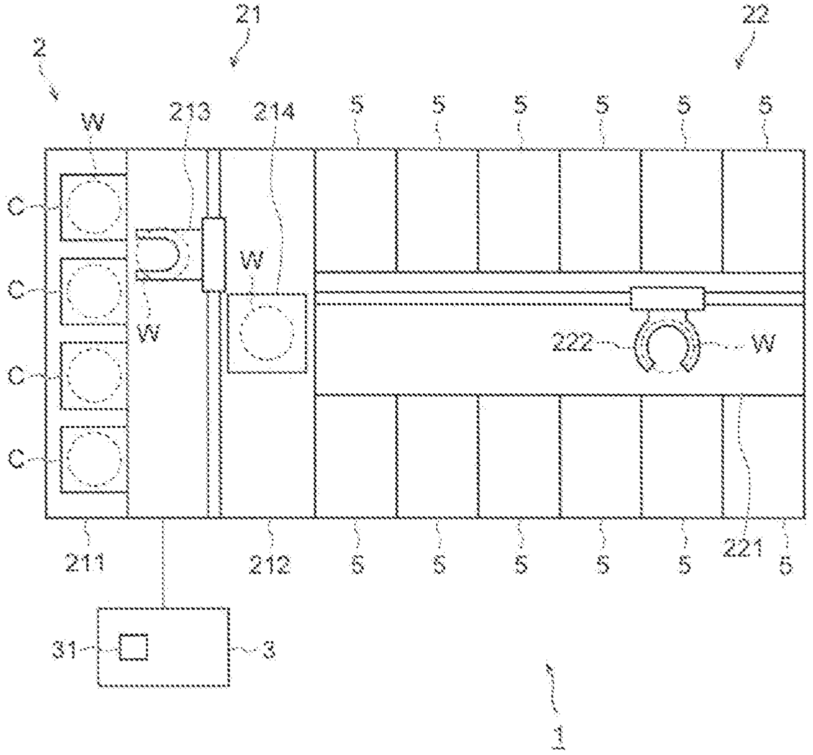
FIG. 1 is a schematic diagram illustrating a configuration of a plating apparatus as an example of a substrate liquid processing apparatus.

First, referring to FIG. 1, a configuration of a substrate liquid processing apparatus will be explained. FIG. 1 is a schematic diagram illustrating a configuration of a plating apparatus as an example of the substrate liquid processing apparatus. Here, the plating apparatus is an apparatus configured to perform a plating processing on a substrate W by supplying a plating liquid onto the substrate W.

As shown in FIG. 1, a plating apparatus 1 includes a plating unit 2 and a controller 3 configured to control an operation of the plating unit 2.

The plating unit 2 is configured to perform various processings on the substrate (wafer) W. The processings performed by the plating unit 2 will be described later.

The controller 3 is, for example, a computer, and includes an operation controller and a storage. The operation controller is configured as, for example, a CPU (Central Processing Unit) and configured to control the operation of the plating unit 2 by reading and executing a program stored in the storage. The storage is configured as a storage device such as a RAM (Random Access Memory), a ROM (Read Only Memory) or a hard disk, and stores therein the program for controlling various processings performed in the plating unit 2. Further, the program may be recorded in a computer-readable recording medium 31, or may be installed from the recording medium 31 to the storage. The computer-readable recording medium 31 may be, for example, a hard disc (HD), a flexible disc (FD), a compact disc (CD), a magneto optical disc (MO), or a memory card. The recording medium 31 stores therein a program that, when executed by a computer for controlling an operation of the plating apparatus 1, causes the computer to control the plating apparatus 1 to perform a plating method to be described later.

Referring to FIG. 1, a configuration of the plating unit 2 will be elaborated. FIG. 1 is a schematic plan view illustrating the configuration of the plating unit 2.

The plating unit 2 is equipped with a carry-in/out station 21; and a processing station 22 provided adjacent to the carry-in/out station 21.

The carry-in/out station 21 includes a placing section 211 and a transfer section 212 provided adjacent to the placing section 211.

In the placing section 211, a plurality of transfer containers (hereinafter, referred to as "carriers C") each of which accommodates therein a plurality of substrates W horizontally is placed.

The transfer section 212 includes a transfer mechanism 213 and a delivery unit 214. The transfer mechanism 213 includes a holding mechanism configured to hold a substrate W, and is configured to be movable horizontally and vertically and pivotable around a vertical axis.

The processing station 22 includes plating devices 5. In the present exemplary embodiment, the number of plating devices 5 provided in the processing station 22 is two or more, but may be one. The plating devices 5 are arranged on both sides of a transfer path 221 which is extended in a predetermined direction (on both sides in a direction perpendicular to a moving direction of a transfer mechanism 222 to be described later).

The transfer path 221 is provided with the transfer mechanism 222. The transfer mechanism 222 includes a holding mechanism configured to hold a substrate W, and is configured to be movable horizontally and vertically and pivotable around a vertical axis.

In the plating unit 2, the transfer mechanism 213 of the carry-in/out station 21 is configured to transfer the substrate W between the carrier C and the delivery unit 214. Specifically, the transfer mechanism 213 takes out the substrate W from the carrier C placed in the placing section 211, and then, places the substrate W in the delivery unit 214. Further, the transfer mechanism 213 takes out the substrate W which is placed in the delivery unit 214 by the transfer mechanism 222 of the processing station 22, and then, accommodates the substrate W in the carrier C of the placing section 211.

In the plating unit 2, the transfer mechanism 222 of the processing station 22 is configured to transfer the substrate W between the delivery unit 214 and the plating device 5 and between the plating device 5 and the delivery unit 214. Specifically, the transfer mechanism 222 takes out the substrate W placed in the delivery unit 214 and carries the substrate W into the plating device 5. Further, the transfer mechanism 222 takes out the substrate W from the plating device 5 and places the substrate W in the delivery unit 214.

Figure 2:
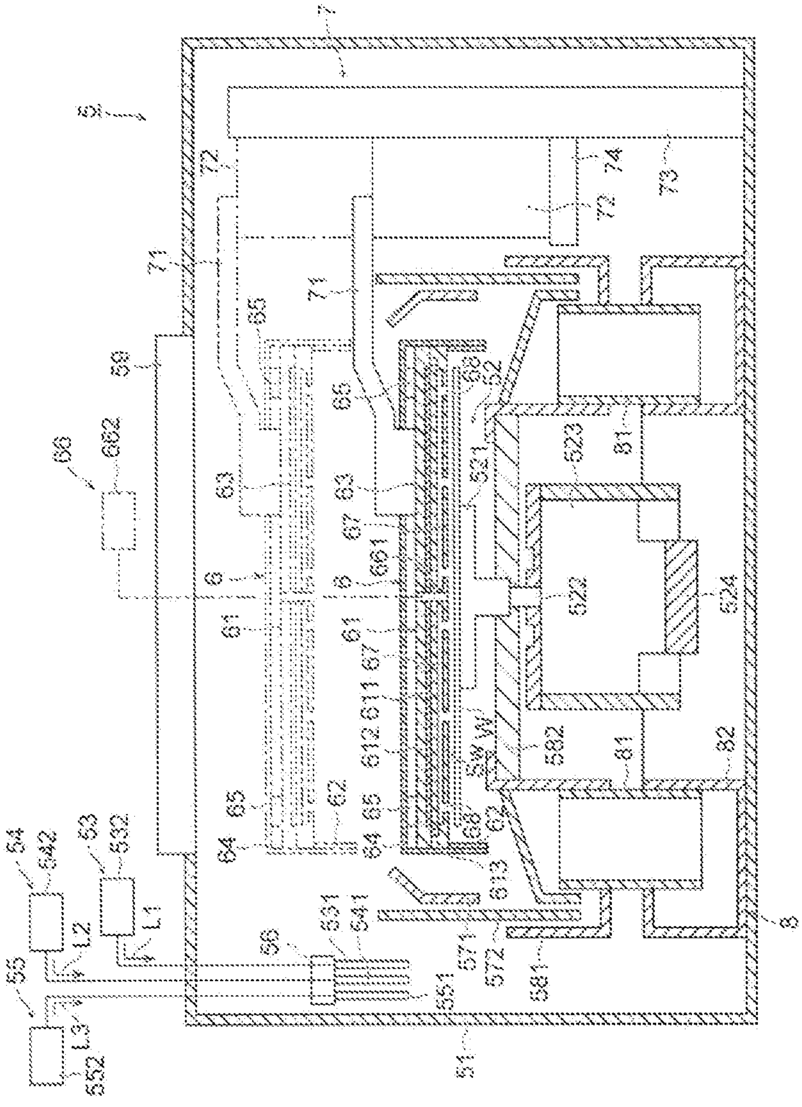
FIG. 2 is a cross sectional view illustrating a configuration example of a plating device.

Hereinafter, referring to FIG. 2, a configuration of the plating device 5 will be described. FIG. 2 is a schematic cross-sectional view showing a configuration of the plating device 5.

The plating device 5 is configured to perform a liquid processing including an electroless plating processing. This plating device 5 includes a chamber 51; a substrate holder 52 disposed within the chamber 51 and configured to hold the substrate W horizontally; and a plating liquid supply 53 configured to supply a plating liquid L1 onto a top surface (processing surface Sw) of the substrate W held by the substrate holder 52. In the present exemplary embodiment, the substrate holder 52 has a chuck member 521 configured to vacuum-attract a bottom surface (rear surface) of the substrate W. This substrate holder 52 is of a so-called vacuum chuck type.

The substrate holder 52 is connected to a rotation motor 523 (rotational driving unit) via a rotation shaft 522. When the rotation motor 523 is driven, the substrate holder 52 is rotated along with the substrate W thereon. The rotation motor 523 is supported at a base 524 fixed to the chamber 51.

The plating liquid supply 53 is equipped with a plating liquid nozzle 531 configured to discharge (supply) the plating liquid L1 onto the substrate W held by the substrate holder 52, and a plating liquid source 532 configured to supply the plating liquid L1 to the plating liquid nozzle 531. The plating liquid source 532 is configured to supply the plating liquid L1 heated to or adjusted to have a predetermined temperature to the plating liquid nozzle 531. A temperature of the plating liquid L1 when the plating liquid L1 is discharged from the plating liquid nozzle 531 is, for example, equal to or larger than 55° C. and equal to or smaller than 75° C., and more desirably, equal to or larger than 60° C. and equal to or smaller than 70° C. The plating liquid nozzle 531 is held by a nozzle arm 56 and configured to be movable.

The plating liquid L1 is an autocatalytic (reduction) plating liquid for electroless plating. The plating liquid L1 contains a metal ion such as a cobalt (Co) ion, a nickel (Ni) ion, a tungsten (W) ion, a copper (Cu) ion, a palladium (Pd) ion or a gold (Au) ion, and a reducing agent such as hypophosphorous acid or dimethylamine borane. The plating liquid L1 may further contain an additive or the like. A plating film (metal film) formed by the plating processing with the plating liquid L1 may be, for example, Cu, CoWB, CoB, CoWP, CoWBP, NiWB, NiB, NiWP, NiWBP, or the like.

The plating device 5 according to the present exemplary embodiment further includes, as other processing liquid supplies, a cleaning liquid supply 54 configured to supply a cleaning liquid L2 onto the top surface of the substrate W held by the substrate holder 52, and a rinse liquid supply 55 configured to supply a rinse liquid L3 onto the top surface of the substrate W.

The cleaning liquid supply 54 is equipped with a cleaning liquid nozzle 541 configured to discharge the cleaning liquid L2 onto the substrate W held by the substrate holder 52, and a cleaning liquid source 542 configured to supply the cleaning liquid L2 to the cleaning liquid nozzle 541. Examples of the cleaning liquid L2 may include an organic acid such as a formic acid, a malic acid, a succinic acid, a citric acid or a malonic acid, or a hydrofluoric acid (DHF) (aqueous solution of hydrogen fluoride) diluted to the extent that it does not corrode a plating target surface of the substrate W. The cleaning liquid nozzle 541 is held by the nozzle arm 56 and configured to be movable along with the plating liquid nozzle 531.

The rinse liquid supply 55 is equipped with a rinse liquid nozzle 551 configured to supply the rinse liquid L3 onto the substrate W held by the substrate holder 52, and a rinse liquid source 552 configured to supply the rinse liquid L3 to the rinse liquid nozzle 551. The rinse liquid nozzle 551 is held by the nozzle arm 56 and configured to be movable along with the plating liquid nozzle 531 and the cleaning liquid nozzle 541. Examples of the rinse liquid L3 may include pure water or the like.

The nozzle arm 56 holding the above-described plating liquid nozzle 531, cleaning liquid nozzle 541 and rinse liquid nozzle 551 is connected to a non-illustrated nozzle moving mechanism. The nozzle moving mechanism is configured to move the nozzle arm 56 horizontally and vertically. More specifically, the nozzle arm 56 is configured to be movable by the nozzle moving mechanism between a discharge position where the processing liquid (plating liquid L1, cleaning liquid L2 or rinse liquid L3) is discharged onto the substrate W and a retreat position retreated from the discharge position. The discharge position is not particularly limited as long as the processing liquid can be supplied onto a certain position on the top surface of the substrate W. For example, desirably, the discharge position is set to a position where the processing liquid can be supplied to a center of the substrate W. The discharge position of the nozzle arm 56 may be set differently in the individual cases of supplying the plating liquid L1, supplying the cleaning liquid L2 and supplying the rinse liquid L3 to the substrate W. The retreat position is a position within the chamber 51 which does not overlap with the substrate W when viewed from above and is spaced apart from the discharge position. When the nozzle arm 56 is located at the retreat position, it is possible to avoid interference between a cover body 6 being moved and the nozzle arm 56.

A cup 571 is disposed around the substrate holder 52. The cup 571 is formed into a ring shape when viewed from above and configured to receive the processing liquid scattered from the substrate W when the substrate W is being rotated and configured to guide the received processing liquid to a drain duct 581 to be described later. An atmosphere blocking cover 572 is provided at an outer peripheral side of the cup 571 and configured to suppress diffusion of the ambient atmosphere around the substrate W in the chamber 51. The atmosphere blocking cover 572 is formed into a vertically extending cylindrical shape and has an open top. The cover body 6 to be descried later can be inserted into the atmosphere blocking cover 572 from above.

The drain duct 581 is provided under the cup 571. The drain duct 581 is formed into a ring shape when viewed from above, and serves to drain the processing liquid falling down after being received by the cup 571 and the processing liquid directly falling down from the vicinity of the substrate W. An inner cover 582 is provided at an inner periphery side of the drain duct 581.

The substrate W held by the substrate holder 52 is covered by the cover body 6. This cover body 6 has a ceiling member 61 and a sidewall member 62 extending downwards from the ceiling member 61. When the cover body 6 is placed at a lower position to be described later, the ceiling member 61 is located above the substrate W held by the substrate holder 52, facing the substrate W at a relatively small distance therebetween.

The ceiling member 61 includes a first ceiling plate 611 and a second ceiling plate 612 provided on the first ceiling plate 611. A heater 63 (heating unit) is interposed between the first ceiling plate 611 and the second ceiling plate 612. The first ceiling plate 611 and the second ceiling plate 612 are provided as a first planar body and a second planar body with the heater 63 interposed therebetween. The first ceiling plate 611 and the second ceiling plate 612 are configured to seal the heater 63 such that the heater 63 is not brought into contact with the processing liquid such as the plating liquid L1. More specifically, a seal ring 613 is provided at an outer peripheral side of the heater 63 between the first ceiling plate 611 and the second ceiling plate 612, and the heater 63 is sealed by the seal ring 613. Desirably, the first ceiling plate 611 and the second ceiling plate 612 have corrosion resistance against the processing liquid such as the plating liquid L1, and may be made of, for example, an aluminum alloy. Further, to improve the corrosion resistance, the first ceiling plate 611, the second ceiling plate 612 and the sidewall member 62 may be coated with Teflon (registered trademark).

A liquid flow path 67 through which pure water (DIW) flows and a plurality of vapor discharge openings 68 connected to the liquid flow path 67 are formed in the first ceiling plate 611. Although the liquid flow path 67 is shown to be provided below the heater 63, the liquid flow path 67 may be provided above the heater 63, or may be provided above and below the heater 63. Each vapor discharge opening 68 is opened downwards to be directed to the processing surface Sw of the substrate W. The pure water in the liquid flow path 67 is heated by heat from the heater 63 and is vaporized to become water vapor. The water vapor produced in this way is ejected from the vapor discharge openings 68 and is used to heat a liquid film of the plating liquid L1 on the substrate W.

The cover body 6 is connected to a cover body moving mechanism 7 via a cover body arm 71. The cover body moving mechanism 7 is configured to move the cover body 6 horizontally and vertically. More specifically, the cover body moving mechanism 7 is equipped with a rotation motor 72 configured to move the cover body 6 horizontally and a cylinder 73 (gap adjusting unit) configured to move the cover body 6 vertically. The rotation motor 72 is provided on a supporting plate 74 configured to be movable up and down with respect to the cylinder 73. Here, instead of the cylinder 73, an actuator (not shown) including a motor and a ball screw may be used.

The rotation motor 72 of the cover body moving mechanism 7 is configured to move the cover body 6 between an upper position located above the substrate W held by the substrate holder 52 and a retreat position retreated from the upper position. The upper position is a position facing the substrate W, which is held by the substrate holder 52, with a relatively large gap therebetween and overlapping with the substrate W when viewed from above. The retreat position is a position within the chamber 51 which does not overlap with the substrate W when viewed from above. When the cover body 6 is located at the retreat position, it is possible to avoid the interference between the nozzle arm 56 being moved and the cover body 6. A rotation axis of the rotation motor 72 is vertically extended, and the cover body 6 is configured to be pivotable horizontally between the upper position and the retreat position.

The cylinder 73 of the cover body moving mechanism 7 is configured to move the cover body 6 up and down and adjust the distance between the first ceiling plate 611 of the ceiling member 61 and the processing surface Sw of the substrate W on which the plating liquid L1 is accumulated. More specifically, the cylinder 73 locates the cover body 6 at the lower position (indicated by a solid line in FIG. 2) and the upper position (indicated by a dashed double-dotted line in FIG. 2).

When the cover body 6 is placed at the lower position, the first ceiling plate 611 comes close to the substrate W. In this case, in order to suppress contamination and loss of the plating liquid L1 or to suppress generation of bubbles in the plating liquid L1, the lower position is set such that the first ceiling plate 611 is not brought into contact with the plating liquid L1 on the substrate W.

The sidewall member 62 of the cover body 6 extends downwards from a periphery of the first ceiling plate 611 of the ceiling member 61, and is located at an outside of the substrate W when the cover body 6 is placed at the lower position. If the cover body 6 is located at the lower position, a lower end of the sidewall member 62 may be located at a position lower than the substrate W.

In the present exemplary embodiment, with the cover body 6 positioned at the lower position, the heater 63 generates heat to vaporize the pure water in the liquid flow path 67, and the water vapor ejected from the vapor discharge openings 68 is mixed with the plating liquid L1 on the substrate W, thus heating the plating liquid L1.

The upper position is set to be a height position at which it is possible to avoid interference of the cover body 6 with surrounding structures such as the cup 571 and the atmosphere blocking cover 572 when the cover body 6 is revolved in a horizontal direction.

In the present exemplary embodiment, an inert gas (for example, a nitrogen ($N_2$) gas) is supplied to an inside of the cover body 6 by an inert gas supply 66. This inert gas supply 66 is equipped with a gas nozzle 661 configured to discharge the inert gas to the inside of the cover body 6; and an inert gas source 662 configured to supply the inert gas to the gas nozzle 661. The gas nozzle 661 is provided at the ceiling member 61 of the cover body 6 and is configured to discharge the inert gas toward the substrate Win the state that the cover body 6 covers the substrate W.

The ceiling member 61 and the sidewall member 62 of the cover body 6 are covered by a cover body cover 64. The cover body cover 64 is provided on the second ceiling plate 612 of the cover body 6 with supporting members 65 therebetween. That is, a plurality of supporting members 65 protruded upwards from an upper surface of the second ceiling plate 612 is provided on the second ceiling plate 612, and the cover body cover 64 is placed on these supporting members 65. The cover body cover 64 is configured to be movable horizontally and vertically along with the cover body 6. Further, it is desirable that the cover body cover 64 has higher thermal insulation property than the ceiling member 61 and the sidewall member 62 to suppress a leakage of the heat within the cover body 6 to the vicinity thereof. For example, desirably, the cover body cover 64 may be made of a resin material. More desirably, the resin material has thermal resistance.

A fan filter unit 59 configured to supply clean air (gas) around the cover body 6 is provided at a top portion of the chamber 51. The fan filter unit 59 supplies air into the chamber 51 (particularly, into the atmosphere blocking cover 572), and the supplied air flows toward an exhaust line 81 to be described later. A downflow of this air is formed around the cover body 6, and a gas vaporized from the processing liquid such as the plating liquid L1 flows toward the exhaust line 81 along with this downflow. Accordingly, it is possible to suppress the rise and diffusion of the gas vaporized from the processing liquid within the chamber 51.

The gas supplied from the fan filter unit 59 is exhausted by a gas exhaust mechanism 8. The gas exhaust mechanism 8 is equipped with two exhaust lines 81 provided under the cup 571 and an exhaust duct 82 provided under the drain duct 581. The two exhaust lines 81 penetrate a bottom portion of the drain duct 581 and individually communicate with the exhaust duct 82. The exhaust duct 82 is formed into a substantially semi-circular ring shape when viewed from above. In the present exemplary embodiment, the single exhaust duct 82 is provided under the drain duct 581 and the two exhaust lines 81 communicate with this exhaust duct 82.

Heating Element

Now, a configuration example of a heating element configured to heat the plating liquid L1 on the processing surface Sw of the substrate W will be explained. Although this heating element is composed of the cover body 6 which covers the processing surface Sw in the above-described example shown in FIG. 2, the heating element may include another element (for example, a lower cover body to be described later) in addition to the cover body 6 or instead of the cover body 6.

First Exemplary Embodiment

Figure 3:
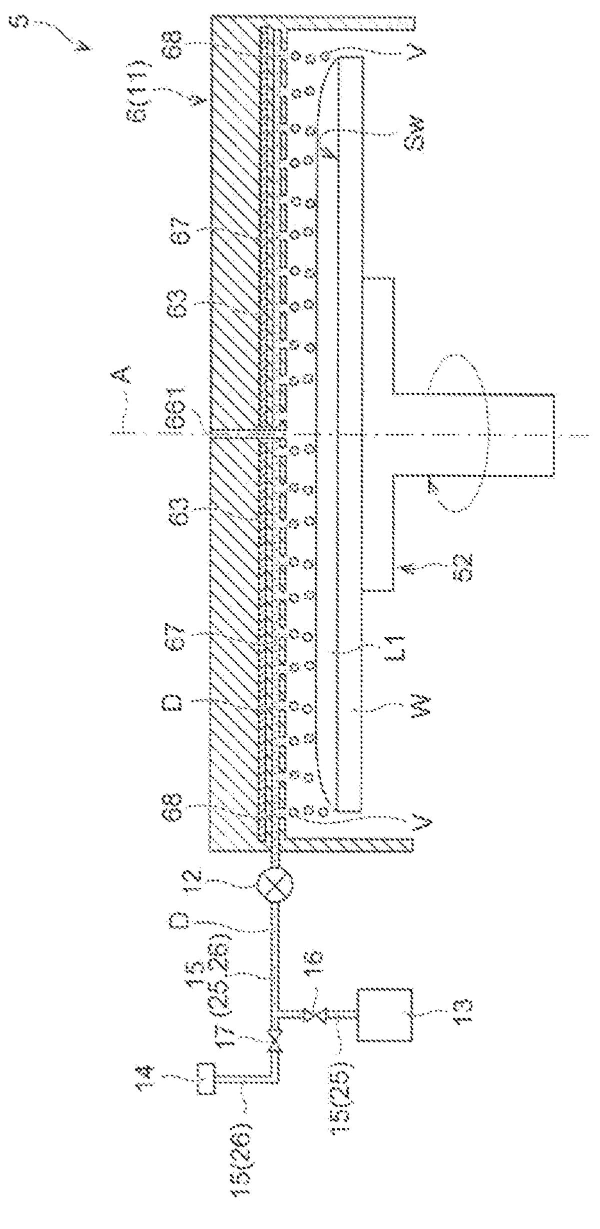
FIG. 3 is a diagram illustrating a schematic configuration of a heating element according to a first exemplary embodiment, which shows a state in which a cover body is placed at a lower position.

FIG. 3 is a diagram illustrating a schematic configuration of the heating element 11 according to a first exemplary embodiment, which shows a state in which the cover body 6 is placed at the lower position. The present exemplary embodiment corresponds to the above-described plating device 5 shown in FIG. 2. To ease the understanding, however, FIG. 3 illustrates a simplified configuration. For example, illustration of some components constituting the cover body 6 (for example, the first ceiling plate 611 and the second ceiling plate 612 shown in FIG. 2) is omitted in FIG. 3. FIG. 3 illustrates a cross-sectional configuration of the cover body 6, presenting side views of the substrate holder 52, the substrate W and the liquid film of the plating liquid L1.

The heating element 11 according to the present exemplary embodiment includes the cover body 6 having the heater 63, the liquid flow path 67 and the vapor discharge openings 68. The vapor discharge openings 68 of the cover body 6 which covers the processing surface Sw of the substrate W when located at the lower position eject water vapor V between the processing surface Sw and the cover body 6. The water vapor V ejected from each vapor discharge opening 68 is in the form of a gas or microscopic water droplets (aerosol) between the processing surface Sw and the cover body 6. Meanwhile, the water vapor V is changed into a liquid (pure water) as it comes into contact with or gets contained in the plating liquid L1 on the substrate W.

The liquid flow path 67 extends over a range longer than the processing surface Sw of the substrate W in horizontal directions (transversal directions in FIG. 3). The liquid flow path 67 covers the entire processing surface Sw in at least one of the horizontal directions when the cover body 6 is located at the lower position. That is, in the state that the cover body 6 is placed at the lower position, the liquid flow path 67 is not necessarily provided so as to cover the entire processing surface Sw, but is extended so as to cover the entire range between both ends of the processing surface Sw in any of the horizontal directions.

The plurality of vapor discharge openings 68 are arranged so as to be distributed in a substantially uniform manner in the horizontal directions. It is desirable that each vapor discharge opening 68 has a diameter allowing the water vapor V in the liquid flow path 67 to pass therethrough but basically not allowing the pure water D in the liquid flow path 67 to pass therethrough due to a surface tension under a normal atmospheric pressure in the chamber 51 (see FIG. 2). At least some of the plurality of vapor discharge openings 68 of the cover body 6 are arranged to face the entire processing surface Sw in at least one of the horizontal directions in the state that the cover body 6 is located at the lower position. That is, in the state that the cover body 6 is disposed at the lower position, at least some of the vapor discharge openings 68 do not necessarily face the entire processing surface Sw, but are distributed so as to face the entire range between both ends of the processing surface Sw in any of the horizontal directions.

According to the above-described configuration, the plurality of vapor discharge openings 68 of the cover body 6 can eject the water vapor V toward the entire processing surface Sw of the substrate W including an outer periphery thereof. In particular, by ejecting the water vapor V from each vapor discharge opening 68 while rotating the substrate W about a rotation axis A by the substrate holder 52, the whole of the plating liquid L1 on the processing surface Sw can be heated by the water vapor V. Further, the water vapor V may be ejected from each vapor discharge opening 68 without rotating the substrate W. In this case, it is desirable that the plurality of vapor discharge openings 68 of the cover body 6 are distributed so as to face the entire processing surface Sw of the substrate W.

The water vapor V changes into a liquid (pure water) as it comes into contact with or gets contained in the plating liquid L1 on the substrate W, and thus releases latent heat. Accordingly, the plating liquid L1 on the substrate W is heated by the latent heat released from the water vapor V. Further, the pure water immediately after the water vapor V changes from the gas to the liquid has a high temperature (for example, a temperature of around 100° C.). For this reason, due to a temperature difference between the plating liquid L1 on the substrate W and the high-temperature pure water mixed in the plating liquid L1, the plating liquid L1 is further heated.

A pure water source 13 and a compressed gas source 14 (gas supply) are connected to the liquid flow path 67 via a supply line 15. The supply line 15 may be configured as one body with the liquid flow path 67, or may be configured as a separate body from the liquid flow path 67. The liquid flow path 67 mainly refers to a flow path provided within the cover body 6, and the supply line 15 mainly refers to a pipeline provided outside the cover body 6.

A pure water supply switching valve 16 and a flow rate control valve 12 are provided in the supply line 15 between the pure water source 13 and the liquid flow path 67. The flow rate control valve 12 is positioned between the liquid flow path 67 and the pure water supply switching valve 16. A supply line 15 connected to the compressed gas source 14 is branched from the supply line 15 connecting the flow rate control valve 12 and the pure water supply switching valve 16, and a gas supply switching valve 17 is provided in the supply line 15 between this branch point and the compressed gas source 14. The pure water supply switching valve 16 and the gas supply switching valve 17 are switched to allow or block the flow of the pure water D and the compressed gas in the supply line 15, respectively. The flow rate control valve 12 is configured to adjust supply amounts of the pure water D and the compressed gas from the supply line 15 (a pure water supply 25 and a gas supply 26) into the liquid flow path 67.

In the configuration shown in FIG. 3, a part of the supply line 15 connected to the liquid flow path 67 and the pure water source 13 functions as the pure water supply 25 configured to supply the pure water D into the liquid flow path 67. Meanwhile, a part of the supply line 15 connected to the liquid flow path 67 and the compressed gas source 14 serves as the gas supply 26 configured to supply the compressed gas into the liquid flow path 67. A portion of the supply line 15 on the downstream side of the gas supply switching valve 17 and on the downstream side of the pure water supply switching valve 16 functions as both the pure water supply 25 and the gas supply 26, so that both the pure water D from the pure water source 13 and the compressed gas from the compressed gas source 14 can be flown.

The flow rate control valve 12, the pure water supply switching valve 16, the gas supply switching valve 17, the heater 63, and the substrate holder 52 are driven under the control of the controller 3 (see FIG. 1). For example, when the pure water D is supplied from the pure water source 13 to the liquid flow path 67, the pure water supply switching valve 16 is opened whereas the gas supply switching valve 17 is closed, and the supply amount of the pure water D into the liquid flow path 67 is adjusted by the flow rate control valve 12. On the other hand, when the compressed gas is supplied from the compressed gas source 14 to the liquid flow path 67, the pure water supply switching valve 16 is closed whereas the gas supply switching valve 17 is opened, and the supply amount of the compressed gas into the liquid flow path 67 is adjusted by the flow rate control valve 12. The timing for supplying the compressed gas from the compressed gas source 14 to the liquid flow path 67 is not particularly limited. Typically, when a maintenance work is performed, the compressed gas may be sent from the compressed gas source 14 into the liquid flow path 67 in order to discharge all the pure water D in the liquid flow path 67 from the vapor discharge openings 68.

The controller 3 of the present exemplary embodiment also functions as a vapor ejection controller, and controls at least either one of the heater 63 and the flow rate control valve 12 to adjust the ejection of the water vapor V from each vapor discharge opening 68.

By way of example, the controller 3 controls the flow rate control valve 12 to change the amount of the pure water D supplied to the liquid flow path 67, thereby adjusting an ejection amount of the water vapor V from each vapor discharge opening 68. If the amount of the pure water D in the liquid flow path 67 is increased in the state that a heating temperature of the heater 63 is set to a predetermined temperature, the heater 63 generates greater heat so that the heating temperature does not drop below the predetermined temperature. As a result, a larger amount of pure water D is vaporized in the liquid flow path 67, and a larger amount of water vapor V is ejected from each vapor discharge opening 68. On the other hand, if the amount of the pure water D in the liquid flow path 67 is decreased in the state that the heating temperature of the heater 63 is set to the predetermined temperature, the heater 63 suppresses a heating amount so that the heating temperature does not rise above the predetermined temperature. As a result, a smaller amount of pure water D is vaporized in the liquid flow path 67, and a smaller amount of water vapor V is ejected from each vapor discharge opening 68. Using this characteristic of the heater 63, the controller 3 controls the flow rate control valve 12 to increase or decrease the amount of the pure water D in the liquid flow path 67, so that the ejection amount of the water vapor V from each vapor discharge opening 68 can be adjusted.

In addition, the controller 3 is capable of adjusting the ejection amount of the water vapor V from each vapor discharge opening 68 by controlling a heating state of the heater 63. By increasing a heating amount of the heater 63, a larger amount of pure water D is vaporized in the liquid flow path 67, and a larger amount of water vapor V is ejected from each vapor discharge opening 68. Meanwhile, by reducing the heating amount of the heater 63, a smaller amount of pure water D is vaporized, and a smaller amount of water vapor V is ejected from each vapor discharge opening 68.

When the supply amount of the pure water D into the liquid flow path 67 is larger than an evaporation amount of the pure water Din the liquid flow path 67, there is a risk that the pure water D overflown from the liquid flow path 67 may leak from the vapor discharge openings 68. On the other hand, when the supply amount of the pure water D into the liquid flow path 67 is smaller than the evaporation amount of the pure water D in the liquid flow path 67, there is a risk that all the pure water D in the liquid flow path 67 may be evaporated and heat may be applied to this empty liquid flow path 67. Therefore, from the viewpoint of suppressing the liquid from dripping from the vapor discharge openings 68 or the heat from being applied to the empty liquid flow path 67, it is desirable that the controller 3 controls the flow rate control valve 12 so that an appropriate amount of pure water D exists in the liquid flow path 67 while the water vapor V is being discharged from the vapor discharge openings 68.

If the heater 63 generates heat in the state that the pure water D does not exist in the liquid flow path 67 (that is, the liquid flow path 67 is empty), the plating liquid L1 on the substrate W can be heated by radiant heat. Thus, when the plating liquid L1 on the substrate W is required to be heated by the radiant heat, the supply of the pure water D into the liquid flow path 67 may be intentionally stopped. For example, in case that the plating liquid L1 is heated by the water vapor V in the first half of a heating process and heated by the radiant heat caused by the heat generation of the heater 63 in the second half, the controller 3 may control the flow rate control valve 12 to intentionally evaporate all the pure water D in the liquid flow path 67.

Now, an example of a plating method (a substrate liquid processing method) performed by the plating device 5 shown in FIG. 3 will be described. Although detailed description is omitted, each of the following processings is performed appropriately as the individual components of the plating apparatus 1 is operated under the control of the controller 3. Further, when necessary, a processing and an operation of each component which are not described in the following description may be performed.

The substrate W carried into the plating device 5 is loaded on and held by the substrate holder 52.

Then, the plating liquid L1 is supplied onto the processing surface Sw of the substrate W held by the substrate holder 52 from the plating liquid supply 53 (see FIG. 2). Specifically, the nozzle arm 56 is placed at the discharge position in the state that the cover body 6 is located at the upper position, and the plating liquid L1 is discharged from the plating liquid nozzle 531 toward the processing surface Sw. Further, prior to the supply of the plating liquid L1 onto the substrate W, cleaning of the processing surface Sw using the cleaning liquid L2 and rinsing of the processing surface Sw using the rinse liquid L3 are performed.

Thereafter, the liquid film of the plating liquid L1 on the processing surface Sw of the substrate W is heated by the cover body 6 (that is, the heating element 11). To elaborate, after a required amount of the plating liquid L1 is supplied onto the substrate W to thereby form the liquid film of the plating liquid L1 on the processing surface Sw, the nozzle arm 56 is moved to the retreat position, and the cover body 6 is located at the lower position. Then, with the cover body 6 placed at the lower position, the heater 63 is operated to vaporize the pure water D in the liquid flow path 67, and the water vapor V is ejected toward the plating liquid L1 on the processing surface Sw from the respective vapor discharge openings 68.

In addition, the timing for starting the ejection of the water vapor V from the vapor discharge openings 68 is not particularly limited. For example, the ejection of the water vapor V from the vapor discharge openings 68 may be begun before the cover body 6 is positioned at the lower position (for example, while the cover body 6 is kept at the upper position or while the cover body 6 is being moved from the upper position to the lower position). Furthermore, the ejection of the water vapor V from the vapor discharge openings 68 may be begun after the cover body 6 is located at the lower position. The timing for starting the ejection of the water vapor V is set based on, by way of example, the timing for starting the heat generation of the heater 63 and/or the timing for starting the supply of the pure water D into the liquid flow path 67.

As the water vapor V ejected from each vapor discharge opening 68 comes into contact with and gets contained in the plating liquid L1 on the processing surface Sw, the plating liquid L1 is heated and the plating processing on the processing surface Sw can be accelerated. The heating of the plating liquid L1 using the water vapor V is carried out based on the latent heat released when the water vapor V changes from the gas to the liquid (pure water) and the temperature difference between the high-temperature liquid (pure water) and the plating liquid L1 as stated above. Therefore, as compared to a case where the plating liquid L1 is heated by discharging a high-temperature gas (for example, an inert gas) other than the vapor to the plating liquid L1, the temperature of the plating liquid L1 on the substrate W can be raised rapidly with high energy efficiency. Meanwhile, in the liquid flow path 67, the water vapor V after being changed from the liquid (pure water D) to the gas (water vapor V) and ejected from the vapor discharge openings 68 has a temperature around a boiling point of the pure water (normally, a temperature of around 100° C.). Therefore, the plating liquid L1 on the substrate W is not exposed to a gas of a high temperature significantly exceeding 100° C. (for example, a temperature of 200° C. or higher), but is heated by the water vapor V having the temperature around 100° C. For this reason, the degree of the thermal deterioration of the plating liquid L1 accompanying the heating is very small.

After the plating processing on the processing surface Sw of the substrate W is finished, rinsing of the processing surface Sw using the rinse liquid L3 and drying of the processing surface Sw are performed. Thereafter, the substrate W is released from the substrate holder 52 and carried out from the plating device 5. Specific ways to carry out these processings are not particularly limited. For example, although the drying of the substrate W is typically performed by rotating the substrate W at a high speed, the inert gas may be discharged to the substrate W by the inert gas supply 66 to accelerate the drying of the processing surface Sw.

As described above, according to the present exemplary embodiment, since the plating liquid L1 on the processing surface Sw of the substrate W is heated by using the water vapor V, the plating liquid L1 can be heated rapidly while the thermal deterioration thereof is suppressed.

Further, the water vapor V is converted into the liquid at a portion of the plating liquid L1 on the substrate W to which it is ejected, and the latent heat is emitted. Therefore, as compared to a case where the plating liquid L1 is heated by using a high-temperature gas that is not liquefied even when in contact with the plating liquid L1, the plating liquid L1 on the substrate W can be locally heated more effectively. Therefore, the degree of heating of the plating liquid L1 can be easily changed for each area. For example, the degree of heating of the plating liquid L1 at the outer periphery of the substrate W is made to be larger than the degree of heating of the plating liquid L1 at other positions, so that the temperature of the whole plating liquid L1 on the substrate W can be uniformed. The progress of the plating processing depends on the temperature of the plating liquid L1. Therefore, by making uniform the temperature of the whole plating liquid L1 by way of adjusting the degree of heating of the plating liquid L1 on the substrate W for each area, the plating processing over the entire processing surface Sw of the substrate W can be stabilized.

Moreover, as compared to the water vapor V (gas), since the pure water D (liquid) has a high moisture density and a temperature close to the normal temperature, it is excellent in handling property. Therefore, the apparatus and the method of the present exemplary embodiment in which the pure water D is sent into the liquid flow path 67 of the cover body 6 and the water vapor V produced in the liquid flow path 67 is used to heat the plating liquid L1 are excellent in convenience and safety. In addition, according to the present exemplary embodiment, since the water vapor V used for the heating of the plating liquid L1 on the substrate W is produced from the pure water D directly above the plating liquid L1, the water vapor V need not be moved for a long distance in the form of the gas. Thus, energy efficiency is high.

In addition, since the water vapor V used for the heating of the plating liquid L1 on the substrate W has the temperature of around 100° C., influence on the surrounding environment is small, as compared to a case of using a gas of a higher temperature. Furthermore, since the water vapor V becomes water at the normal temperature (room temperature), influence on the surrounding environment is very small in the chemical aspect as well.

Second Exemplary Embodiment

In a second exemplary embodiment, same or similar parts to those described in the first exemplary embodiment will be assigned same reference numerals, and detailed description thereof will be omitted.

Figure 4:
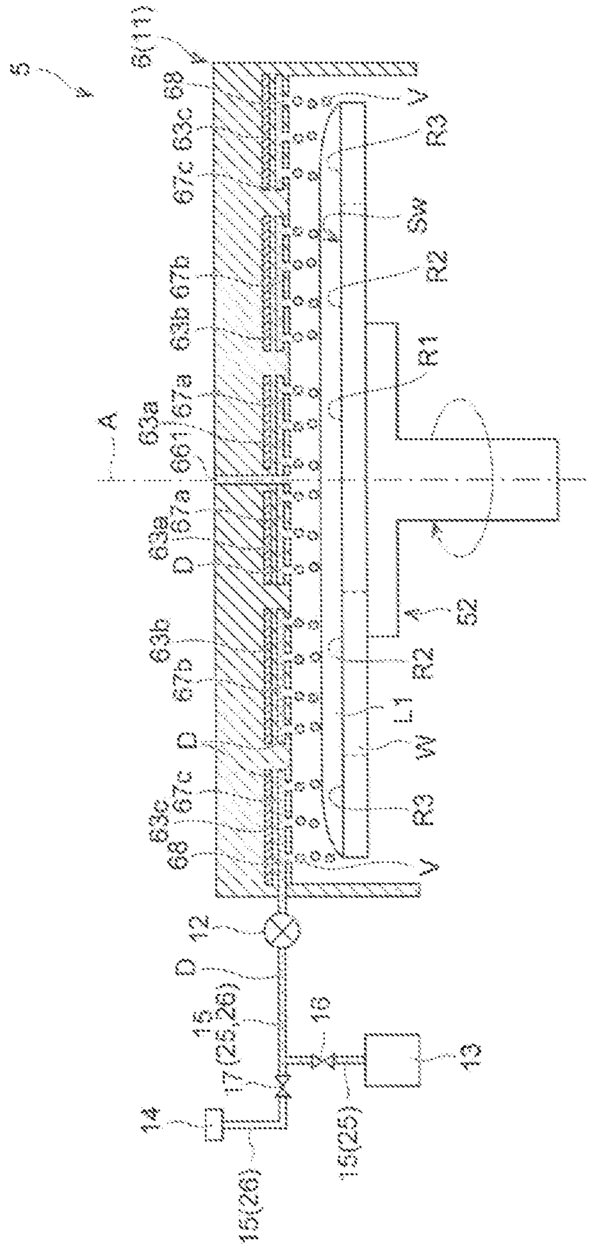
FIG. 4 is a diagram illustrating a schematic configuration of a heating element according to a second exemplary embodiment, which shows a state in which a cover body is placed at a lower position.

FIG. 4 is a diagram illustrating a configuration example of the heating element 11 according to the second exemplary embodiment, which shows a state in which the cover body 6 is located at the lower position. To ease the understanding, FIG. 4 shows a simplified configuration.

The processing surface Sw of the substrate W includes a plurality of processing regions (in the example shown in FIG. 4, a first processing region R1, a second processing region R2, and a third processing region R3). In the example shown in FIG. 4, the three processing regions R1 to R3 are defined based on a distance from the rotation axis A (that is, a central axis of the substrate W) when the substrate W is rotated by the substrate holder 52. The first processing region R1 is a circular region through which the rotation axis A passes; the third processing region R3, an annular region including the outer periphery of the substrate W; and the second processing region R2, an annular region between the first processing region R1 and the third processing region R3.

One or more vapor discharge openings 68 are provided for each of these processing regions R1 to R3. With the cover body 6 positioned at the lower position, each vapor discharge opening 68 is disposed directly above the corresponding processing region, and opened toward the corresponding processing region. The water vapor V ejected from each vapor discharge opening 68 flows toward the corresponding processing region of the substrate W and is used to heat the plating liquid L1 on the corresponding processing region.

The liquid flow path 67 includes a plurality of division flow paths (in the example shown in FIG. 4, a first division flow path 67*a*, a second division flow path 67*b*, and a third division flow path 67*c*) respectively corresponding to the plurality of processing regions R1 to R3. Each of the plurality of division flow paths 67*a* to 67*c* is connected to the vapor discharge openings 68 allocated to the corresponding processing region. The pure water D in each of the plurality of division flow paths 67*a* to 67*c* is heated by the heater 63 to be vaporized, and is ejected from the corresponding vapor discharge openings 68 in the form of water vapor.

The heater 63 includes a plurality of division heater sections (in the example shown in FIG. 4, a first division heater section 63*a*, a second division heater section 63*b*, and a third division heater section 63*c*) respectively corresponding to the plurality of processing regions R1 to R3. Each of the plurality of division heater sections 63*a* to 63*c* is disposed so as to cover the whole of the corresponding one of the division flow paths 67*a* to 67*c* allocated to the corresponding processing region, and heats the pure water D in the corresponding one of the division flow paths 67*a* to 67*c*.

The controller 3 (vapor ejection controller) adjusts the ejection of the water vapor V from the plurality of vapor discharge openings 68 for each of the processing regions R1 to R3. Specifically, the ejection amount of the water vapor V from each vapor discharge opening 68 is adjusted for each of the processing regions R1 to R3, and the degree of heating of the plating liquid L1 by the water vapor V can be varied for each of the processing regions R1 to R3.

In general, in the plating liquid L1 on the substrate W, the temperature of the plating liquid L1 on the outer periphery of the substrate W (that is, on the third processing region R3) tends to easily decrease locally. When this tendency appears, the local temperature drop of the plating liquid L1 on the outer periphery of the processing surface Sw can be suppressed by setting the amount of the water vapor V ejected toward the outer periphery of the processing surface Sw of the substrate W to be larger than the amount of the water vapor V ejected toward other portions of the processing surface Sw. In this way, by adjusting the amount of the water vapor V ejected toward each of the processing regions R1 to R3 according to the temperature profile of the plating liquid L1 on the substrate W, a temperature difference of the plating liquid L1 between the processing regions R1 to R3 can be reduced, so that the temperature of the entire plating liquid L1 can be uniformed.

As an example method of adjusting the amount of the water vapor V ejected from each vapor discharge opening 68 for each of the processing regions R1 to R3, the controller 3 may control the flow rate control valve 12 to control the supply amount of the pure water D to each of the plurality of division flow paths 67*a* to 67*c* from the pure water supply 25. In this case, a relatively large amount of pure water D is supplied to the division flow path corresponding to the processing region where ejection of a relatively large amount of water vapor V is required, whereas a relatively small amount of pure water D is supplied to the division flow path corresponding to the processing region where ejection of a relatively small amount of water vapor V is required. As described above, the plurality of division heater sections 63*a* to 63*c* have a characteristic that "the degree of heat generation thereof changes depending on the amount of the pure water D within the corresponding division flow paths 67*a* to 67*c*." For this reason, a relatively large amount of water vapor V is generated in the division flow path to which a relatively large amount of pure water D is supplied, and a relatively small amount of water vapor V is generated in the division flow path to which a relatively small amount of pure water D is supplied. Therefore, by adjusting the supply amount of the pure water D to each of the plurality of division flow paths 67*a* to 67*c*, the ejection amount of the water vapor V can be changed for each processing region.

When adjusting the ejection amount of the water vapor V for each of the processing regions R1 to R3 by adjusting the supply amount of the pure water D to each of the plurality of division flow paths 67*a* to 67*c*, the plurality of division flow paths 67*a* to 67*c* do not have to be connected to each other. For example, the flow rate control valve 12 and each of the division flow paths 67*a* to 67*c* may be connected via separate supply lines (not shown), and the flow rate control valve 12 may adjust flow rates of the pure water D supplied to these division flow path 67*a* to 67*c* independently under the control of the controller 3. Further, these division flow paths 67*a* to 67*c* may be connected to each other via a non-illustrated communication path. In this case, as each of the division flow paths 67*a* to 67*c* has a specific length and/or volume, for example, it is possible to adjust the supply amount of the pure water D to each of the plurality of division flow paths 67*a* to 67*c*.

As another example, the controller 3 may control each of the plurality of division heater sections 63*a* to 63*c* to adjust heat generation of each of the plurality of division heater sections 63*a* to 63*c*. In this case, the division heater section corresponding to the processing region where the ejection of the relatively large amount of water vapor V is required generates heat with relatively large energy, whereas the division heater section corresponding to the processing region where the ejection of the relatively small amount of water vapor V is required generates heat with relatively small energy.

Third Exemplary Embodiment

In a third exemplary embodiment, same or similar parts to those described in the second exemplary embodiment will be assigned same reference numerals, and detailed description thereof will be omitted.

Figure 5:
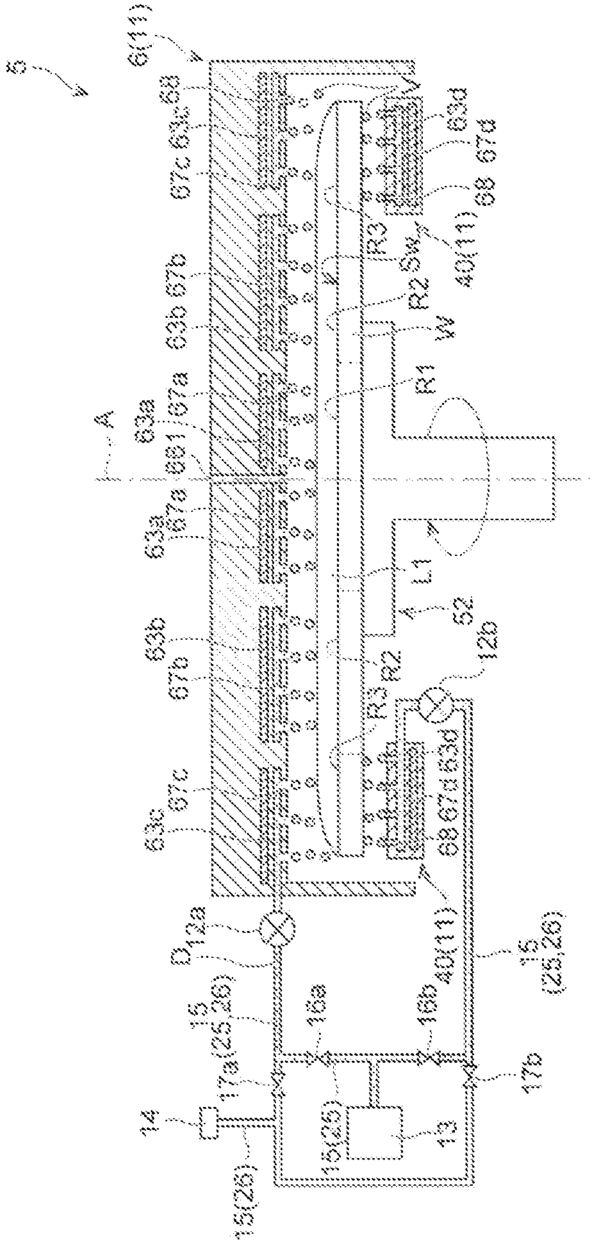
FIG. 5 is a diagram illustrating a schematic configuration of a heating element according to a third exemplary embodiment, which shows a state in which a cover body is placed at a lower position.

FIG. 5 is a diagram illustrating a schematic configuration of the heating element 11 according to the third exemplary embodiment, which shows a state in which the cover body 6 is located at the lower position. To ease the understanding, FIG. 5 illustrates a simplified configuration.

In addition to the cover body 6 which covers the substrate W from above, the heating element 11 of the present exemplary embodiment includes a lower cover body 40 which covers the substrate W from below. The lower cover body 40 has a heater 63 (that is, a fourth division heater section 63*d*), a liquid flow path 67 (that is, a fourth division flow path 67*d*), and a plurality of vapor discharge openings 68. The fourth division flow path 67*d* is formed so as to be covered with the fourth division heater section 63*d*, and is connected to the supply line 15 and the plurality of vapor discharge openings 68.

The lower cover body 40 shown in FIG. 5 has an annular shape when viewed from the top, and covers a part of the substrate W (particularly, the outer periphery of the substrate W corresponding to the third processing region R3) held by the substrate holder 52. Each vapor discharge opening 68 provided in the lower cover body 40 is opened upwards and directed toward the rear surface of the substrate W held by the substrate holder 52 opposite to the processing surface Sw. Each vapor discharge opening 68 of the lower cover body 40 ejects the water vapor V into a gap between the lower cover body 40 and the substrate W toward the rear surface (particularly, the outer periphery corresponding to the third processing region R3) of the substrate W.

The pure water source 13 and the compressed gas source 14 are connected to the fourth division flow path 67*d* via the supply line 15. The supply line 15 may be provided as one body with the fourth division flow path 67*d*, or may be provided as a separate body from the fourth division flow path 67*d*. Here, the fourth division flow path 67*d* mainly refers to a flow path provided in the lower cover body 40, and the supply line 15 mainly refers to a pipeline provided outside the lower cover body 40.

A first pure water supply switching valve 16*a* and a first flow rate control valve 12*a* are provided in the supply line 15 between the pure water source 13 and the third division flow path 67*c*. The first flow rate control valve 12*a* is positioned between the first pure water supply switching valve 16*a* and the third division flow path 67*c*. A second pure water supply switching valve 16*b* and a second flow rate control valve 12*b* are provided in the supply line 15 between the pure water source 13 and the fourth division flow path 67*d*. The second flow rate control valve 12*b* is positioned between the second pure water supply switching valve 16*b* and the fourth division flow path 67*d*.

The supply line 15 connected to the compressed gas source 14 is branched from the supply line 15 connecting the first flow rate control valve 12*a* and the first pure water supply switching valve 16*a*, and a first gas supply switching valve 17*a* is provided in the supply line 15 between this branch point and the compressed gas source 14. The supply line 15 connected to the compressed gas source 14 is branched from the supply line 15 connecting the second flow rate control valve 12*b* and the second pure water supply switching valve 16*b*, and a second gas supply switching valve 17*b* is provided in the supply line 15 between this branch point and the compressed gas source 14.

The first flow rate control valve 12*a*, the second flow rate control valve 12*b*, the first pure water supply switching valve 16*a*, the second pure water supply switching valve 16*b*, the first gas supply switching valve 17*a*, and the second gas supply switching valve 17*b* are driven under the control of the controller 3 (see FIG. 1). Further, the first division heater section 63*a*, the second division heater section 63*b*, the third division heater section 63*c*, and the fourth division heater section 63*d* are also driven under the control of the controller 3.

By way of example, when the pure water is supplied from the pure water source 13 to the third division flow path 67*c*, the first pure water supply switching valve 16*a* is opened whereas the first gas supply switching valve 17*a* is closed, and the supply amount of the pure water to the third division flow path 67*c* is adjusted by the first flow rate control valve 12*a*. Further, when the compressed gas is supplied from the compressed gas source 14 to the third division flow path 67*c*, the first pure water supply switching valve 16*a* is closed whereas the first gas supply switching valve 17*a* is opened, and the supply amount of the compressed gas to the third division flow path 67*c* is adjusted by the first flow rate control valve 12*a*. The first division flow path 67*a*, the second division flow path 67*b*, and the third division flow path 67*c* shown in FIG. 5 are connected to each other via a non-illustrated communication path. Accordingly, as the pure water D and the compressed gas are supplied to the third division flow path 67*c*, the pure water D and the compressed gas are also supplied to the first division flow path 67*a* and the second division flow path 67*b*.

Furthermore, when the pure water D is supplied from the pure water source 13 to the fourth division flow path 67*d*, the second pure water supply switching valve 16*b* is opened whereas the second gas supply switching valve 17*b* is closed, and the supply amount of the pure water to the fourth division flow path 67*d* is adjusted by the second flow rate control valve 12*b*. Further, when the compressed gas is supplied from the compressed gas source 14 to the fourth division flow path 67*d*, the second pure water supply switching valve 16*b* is closed whereas the second gas supply switching valve 17*b* is opened, and the supply amount of the compressed gas to the fourth division flow path 67*d* is adjusted by the second flow rate control valve 12*b*.

According to the present exemplary embodiment, the plating liquid L1 on the substrate W can be heated by the lower cover body 40 from below while being heated by the cover body 6 from above. That is, the same as in the above-described second exemplary embodiment, the plating liquid L1 on the substrate W is heated by the water vapor V ejected from each vapor discharge opening 68 of the cover body 6. Further, the substrate W is heated by the water vapor V ejected from each vapor discharge opening 68 of the lower cover body 40, and the plating liquid L1 is also heated as the substrate W is heated.

As stated above, by using the cover body 6 and the lower cover body 40 as the heating element 11, it is possible to heat the plating liquid L1 on the substrate W to a required temperature more quickly. In addition, by using the lower cover body 40, it is also possible to suppress the amount of the water vapor V ejected from the cover body 6. The water vapor V ejected from the lower cover body 40 heats the plating liquid L1 via the substrate W. Therefore, by using the lower cover body 40, it is possible to heat the plating liquid L1 while suppressing the amount of the water vapor V mixed into the plating liquid L1.

Fourth Exemplary Embodiment

In a fourth exemplary embodiment, same or similar parts to those described in the first to third exemplary embodiment will be assigned same reference numerals, and detailed description thereof will be omitted.

Although the water vapor V discharged from the heating element 11 is mainly used to heat the plating liquid L1 on the substrate W in the first to third exemplary embodiments described above, the water vapor V may be used to heat the substrate W. That is, the heating element 11 may be configured to heat at least one of the plating liquid L1 on the processing surface Sw and the substrate W.

For example, before the plating liquid L1 is supplied onto the processing surface Sw of the substrate W, the substrate W may be heated by using the water vapor V. In this case, it is possible to suppress the temperature of the substrate W from becoming a low temperature by the supply of the plating liquid L1, and, thus, it is possible to suppress the temperature of the plating liquid L1 on the processing surface Sw from being deviated from a temperature suitable for the plating processing. Therefore, the time required to heat the plating liquid L1 on the processing surface Sw so that the plating liquid L1 reaches a required temperature optimal for the plating processing can be shortened.

Figure 6:
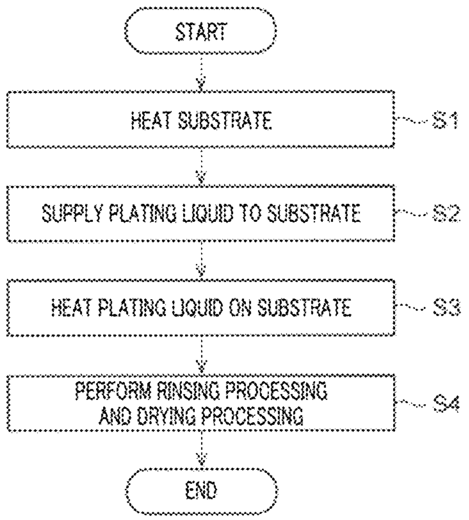
FIG. 6 is a flowchart illustrating a typical example of a plating method (substrate liquid processing method) according to a fourth exemplary embodiment.

FIG. 6 is a flowchart showing a typical example of a plating method (substrate liquid processing method) according to a fourth exemplary embodiment. The plating apparatus 1 (substrate liquid processing apparatus) which implements the plating method according to the present exemplary embodiment is not particularly limited, and the plating method of the present exemplary embodiment can be performed by using any one of the plating devices 5 according to the first to third exemplary embodiments.

In the plating method according to the present exemplary embodiment, the substrate W is directly heated by the water vapor V before the plating liquid L1 is supplied onto the substrate W (see S1 in FIG. 6).

To elaborate, in the state that the substrate W is held by the substrate holder 52 after being carried into the plating device 5, the substrate W is heated by the water vapor V ejected from the vapor discharge openings 68 of the heating element 11 before the plating liquid L1 is supplied to the processing surface Sw. The water vapor V discharged from the vapor discharge openings 68 is brought into contact with the substrate W in the state that nothing is loaded on the processing surface Sw. A position of the substrate W that comes into direct contact with the water vapor V is not particularly limited, and the processing surface Sw and/or the rear surface of the substrate W may be directly heated by the water vapor V. In order to efficiently raise the temperature of the processing surface Sw of the substrate W, it is desirable that at least some of the vapor discharge openings 68 of the heating element 11 are directed toward the processing surface Sw.

The substrate W (particularly, the processing surface Sw) heated by the water vapor V has a temperature higher than the room temperature, but this temperature (for example, equal to or less than 100° C.) is below the temperature of the water vapor V. For example, the substrate W (particularly, the processing surface Sw) heated by the water vapor V has the required temperature optimal for the plating processing or a temperature around the required temperature.

Further, in case that other processings such as a cleaning processing and a rinsing processing are performed before the plating liquid L1 is supplied onto the substrate W after the substrate W is set on the substrate holder 52, the above-described process S1 of heating the substrate W by the heating element 11 is carried out after the other processings are performed.

Thereafter, the plating liquid L1 is supplied from the plating liquid supply 53 (see FIG. 2) onto the processing surface Sw of the substrate W heated by using the water vapor V (S2). Since the processing surface Sw of the substrate W has a temperature higher than the room temperature at the time when the plating liquid L1 is supplied, the temperature of the substrate W can be suppressed from becoming a low temperature due to the supply of the plating liquid L1. In order to suppress a temperature fall of the substrate W due to the supply of the plating liquid L1, it is desirable that the plating liquid L1 having a temperature higher than the room temperature is supplied to the substrate W from the plating liquid supply 53. By way of example, the plating liquid L1 may be discharged from the plating liquid nozzle 531 toward the processing surface Sw so that the plating liquid L1 having the required temperature optimal for the plating processing or the temperature around the required temperature is supplied on the processing surface Sw of the substrate W.

Thereafter, the same as in the above-described first to third exemplary embodiments, the plating liquid L1 on the substrate W is heated by the heating element 11, and the temperature of the plating liquid L1 is regulated to the required temperature suitable for the plating processing, so that the plating processing is accelerated (S3).

For example, when heating the substrate W and the plating liquid L1 by using the water vapor V discharged from the cover body 6 as described above, the cover body 6 is moved from the lower position to the upper position after the substrate W is sufficiently heated by the water vapor V. Then, the plating liquid nozzle 531 is moved to the discharge position, and the plating liquid L1 is supplied onto the substrate W from the plating liquid nozzle 531 positioned at the discharge position. After the supply of the plating liquid L1 onto the substrate W is finished, the plating liquid nozzle 531 is moved to the retreat position, and the cover body 6 is moved from the upper position to the lower position. The plating liquid L1 on the substrate W is heated by the water vapor V from the vapor discharge openings 68 of the cover body 6 located at the lower position.

Thereafter, the plating liquid L1 on the substrate W is washed away through the rinsing processing, and the substrate W is dried through the drying processing (S4).

Fifth Exemplary Embodiment

In a fifth exemplary embodiment, same or similar parts to those described in the fourth exemplary embodiment will be assigned same reference numerals, and detailed description thereof will be omitted.

In the present exemplary embodiment as well, the substrate W is heated prior to the supply of the plating liquid L1. Here, however, the substrate W is heated through a heating medium liquid on the substrate W. That is, the heating medium liquid on the substrate W is directly heated by using the water vapor V, and the substrate W is indirectly heated by the heating medium liquid whose temperature has risen. The heating medium liquid to be used is not particularly limited, and, typically, pure water may be used as the heating medium liquid. The following description will be provided for an example where the pure water discharged as the rinse liquid L3 from the rinse liquid nozzle 551 (see FIG. 2) of the rinse liquid supply 55 is used as the heating medium liquid.

Figure 7:
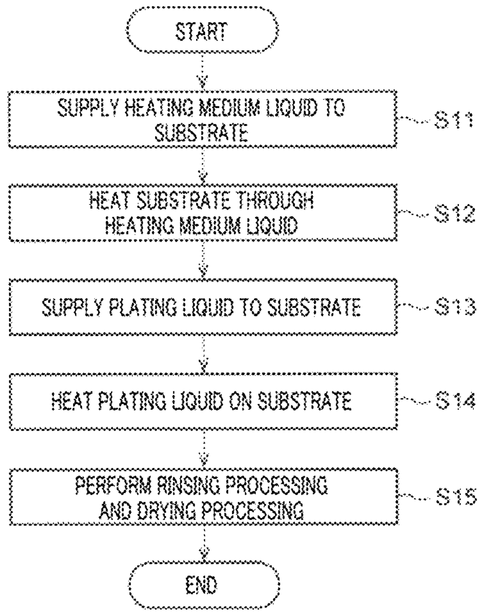
FIG. 7 is a flowchart illustrating a typical example of a plating method (substrate liquid processing method) according to a fifth exemplary embodiment.

FIG. 7 is a flowchart showing a typical example of a plating method (substrate liquid processing method) according to the fifth exemplary embodiment. The plating apparatus 1 (substrate liquid processing apparatus) which implements the plating method of the present exemplary embodiment is not particularly limited, and the plating method of the present exemplary embodiment may be performed by any one of the plating devices 5 according to the first to third exemplary embodiments described above.

In the plating method of the present exemplary embodiment, the pure water (heating medium liquid) is supplied onto the processing surface Sw of the substrate W before the plating liquid L1 is supplied onto the substrate W (see S11 in FIG. 7). In the present exemplary embodiment, the pure water is supplied onto the processing surface Sw of the substrate W from the rinse liquid supply 55.

Thereafter, the substrate W is heated by the heating element 11 through the pure water (heating medium liquid) on the processing surface Sw of the substrate W (S12). To elaborate, the substrate W is heated by heating the pure water on the processing surface Sw of the substrate W, using the water vapor V ejected from the vapor discharge openings 68 of the heating element 11. Accordingly, the substrate W is given a temperature higher than the room temperature, for example, a required temperature optimal for the plating processing, or a temperature around this required temperature. In addition, in order to shorten a heating time of the substrate W, it is desirable that heated pure water (heating medium liquid) is supplied to the substrate W. By way of example, the pure water (heating medium liquid) having the required temperature optimal for the plating processing or the temperature around the required temperature may be supplied to the processing surface Sw.

Subsequently, the plating liquid L1 is supplied from the plating liquid supply 53 (see FIG. 2) onto the processing surface Sw of the substrate W heated through the pure water (heating medium liquid), and the pure water (heating medium liquid) on the processing surface Sw is replaced with the plating liquid L1 (S13). Typically, by discharging the plating liquid L1 from the plating liquid nozzle 531 disposed at the discharge position toward the processing surface Sw while rotating the substrate W by the substrate holder 52, it is possible to replace the pure water on the processing surface Sw with the plating liquid L1 gradually.

Afterwards, the same as in the fourth exemplary embodiment described above, the plating liquid L1 on the substrate W is heated by the heating element 11 (S14). Then, the plating liquid L1 on the substrate W is washed away through the rinsing processing, and then dried through the drying process (S15).

For example, when the substrate W and the plating liquid L1 are heated by using the water vapor V discharged from the cover body 6 described above, the pure water (heating medium liquid) is discharged toward the processing surface Sw of the substrate W from the rinse liquid nozzle 551 disposed at the discharge position while the cover body 6 is located at the upper position. Thereafter, the rinse liquid nozzle 551 is moved to the retreat position, the cover body 6 is moved to the lower position, and the pure water (heating medium liquid) on the substrate W is heated by the water vapor V discharged from the vapor discharge openings 68 of the cover body 6 located at the lower position. Thereafter, the cover body 6 is moved to the upper position, the plating liquid nozzle 531 is moved to the discharge position, and the plating liquid L1 is discharged toward the processing surface Sw of the substrate W from the plating liquid nozzle 531 disposed at the discharge position. Upon the completion of the supply of the plating liquid L1 onto the substrate W, the plating liquid nozzle 531 is moved to the retreat position, and the cover body 6 is moved from the upper position to the lower position. The plating liquid L1 on the substrate W is heated by the water vapor V discharged from the vapor discharge openings 68 of the cover body 6 placed at the lower position.

Furthermore, the technique of the above-described fourth and fifth exemplary embodiments in which the substrate W is heated by using the water vapor V prior to the supply of the plating liquid L1 may be applicable to a case where the plating liquid L1 on the substrate W is heated by using a medium other than the water vapor V or a case where the plating liquid L1 on the substrate W is not heated.

Modification Examples

The heater 63, the liquid flow path 67 and the plurality of vapor discharge openings 68 of the cover body 6 may be disposed so as to face the entire processing surface Sw of the substrate W, or to face only a part of the processing surface Sw. Likewise, the heater 63, the liquid flow path 67 and the plurality of vapor discharge openings 68 of the lower cover body 40 may be disposed so as to face the entire rear surface of the substrate W or a part thereof. As an example, when the temperature of the plating liquid L1 on the outer periphery of the substrate W is easily likely to decrease locally, it is desirable that the heating element 11 (that is, the cover body 6 and/or the lower cover body 40) ejects the water vapor V toward the outer periphery of the substrate W at least.

Further, the water vapor V may be ejected from either one of the cover body 6 and the lower cover body 40 while it is not ejected from the other. For example, while the water vapor V is ejected from each vapor discharge opening 68 of the lower cover body 40 toward the rear surface of the substrate W, the pure water D may not be supplied into the liquid flow path 67 of the cover body 6, and the plating liquid L1 may be heated by the radiant heat from the heat generated by the heater 63 of the cover body 6.

In addition to the heating of the plating liquid L1 using the water vapor V, the heating element 11 may use a heating medium other than that described above. For example, while ejecting the water vapor V from the cover body 6 and/or the lower cover body 40, a high-temperature inert gas may be supplied into the gap between the cover body 6 and the substrate W by the inert gas supply 66 (the gas nozzle 661).

Further, the liquid flow path 67 extending in the horizontal direction in the cover body 6 and/or the lower cover body 40 may be provided between the substrate W held by the substrate holder 52 and the heater 63, or may be provided on the opposite side to the substrate W with the heater 63 therebetween. When the liquid flow path 67 extending in the horizontal direction is provided on the opposite side to the substrate W with the heater 63 interposed therebetween, the heat emitted from the heater 63 toward the liquid flow path 67 is used for the vaporization of the pure water D in the liquid flow path 67, and the heat emitted from the heater 63 toward the substrate W is used for the heating of the plating liquid L1. Moreover, the liquid flow path 67 extending in the horizontal direction may be provided at a position where the corresponding heater 63 is interposed vertically in between. For example, the pure water D may be vaporized in the liquid flow path 67 (first liquid flow path) provided on the opposite side to the substrate W with the heater 63 therebetween, and the water vapor V may be introduced from the first liquid flow path into the liquid flow path 67 (second liquid flow path) provided between the heater 63 and each vapor discharge opening 68. In this case, the water vapor V generated in the first liquid flow path is further heated by the heater 63 in the second liquid flow path, and then is ejected from each vapor discharge opening 68. Therefore, it is possible to suppress the liquid (pure water) from dripping from each vapor discharge opening 68 more reliably.

Furthermore, the temperature of the pure water D supplied to the liquid flow path 67 is not particularly limited, and the pure water D of the normal temperature (room temperature) may be supplied into the liquid flow path 67. Further, the pure water D having the temperature higher than the normal temperature may be supplied into the liquid flow path 67. In this case, the time taken for the vaporization of the pure water D in the liquid flow path 67 can be shortened. The way how to supply the high-temperature pure water D to the liquid flow path 67 is not particularly limited. By way of example, the high-temperature pure water D may be stored in the pure water source 13, or the pure water D in the supply line 15 may be heated by a heating device (not shown) provided at a portion of the supply line 15 led from the pure water source 13 to the liquid flow path 67.

In addition, during an idle operation in which the water vapor V is not ejected from the vapor discharge openings 68, the pure water D may or may not be stored in the liquid flow path 67.

Further, while the water vapor V is being ejected from the cover body 6 and/or the lower cover body 40, the substrate W may be stopped without being rotated by the substrate holder 52. In this case, from the viewpoint of uniformly heating the entire plating liquid L1 on the substrate W by the water vapor V, it is desirable that the plurality of vapor discharge openings 68 of the cover body 6 are distributed uniformly so as to face the entire processing surface Sw.

It should be noted that the above-described exemplary embodiment is illustrative in all aspects and is not anyway limiting. The above-described exemplary embodiment may be omitted, replaced and modified in various ways without departing from the scope and the spirit of claims. By way of example, the exemplary embodiments and the modification examples described above may be combined with each other, or an exemplary embodiment other than those described in the preset disclosure may be combined with the above-described exemplary embodiments or modification examples.

Furthermore, a technical category for embodying the above-described technical concept is not particularly limited. By way of example, the above-described substrate liquid processing apparatus may be applied to another apparatus. Moreover, the above-described technical concept may be embodied by a computer-executable program for executing one or multiple sequences (processes) included in the above-described substrate liquid processing method on a computer. Further, the above-described technical concept may be embodied by a computer-readable non-transitory recording medium in which such a computer-executable program is stored.

I claim:

1. A substrate liquid processing apparatus, comprising:
- a substrate holder configured to hold a substrate;
- a plating liquid supply configured to supply a plating liquid on a processing surface of the substrate; and
- a heating element, configured to heat at least one of the plating liquid on the processing surface or the substrate, comprising a cover body, a heater, a liquid flow path provided horizontally within the cover body, extended in a horizontal direction of the cover body and through which pure water flows, and a vapor discharge opening which extends vertically from the liquid flow path in a vertical direction of the cover body and connected to the liquid flow path and through which water vapor produced as the pure water is vaporized by heat from the heater is ejected,
- wherein the cover body, in which the heater, the liquid flow path, and the vapor discharge opening are provided, is configured to cover the processing surface, and the vapor discharge opening of the cover body ejects the water vapor into a gap between the processing surface and the cover body.

2. The substrate liquid processing apparatus of claim 1,
- wherein the heating element comprises a lower cover body, in which a lower heater, a lower liquid flow path, and a lower vapor discharge opening are provided, configured to cover the substrate from below, and
- the lower vapor discharge opening of the lower cover body ejects the water vapor toward the substrate.

3. The substrate liquid processing apparatus of claim 1,
- wherein the heating element ejects the water vapor toward an outer periphery of the substrate.

4. The substrate liquid processing apparatus of claim 1, further comprising:
- a pure water supply connected to the liquid flow path;
- a flow rate control valve configured to adjust a supply amount of the pure water from the pure water supply into the liquid flow path; and
- a vapor ejection controller configured to control at least one of the heater or the flow rate control valve to adjust ejection of the water vapor from the vapor discharge opening,
- wherein the vapor ejection controller controls the flow rate control valve such that an appropriate amount of the pure water exists in the liquid flow path while the water vapor is being discharged from the vapor discharge opening.

5. The substrate liquid processing apparatus of claim 4,
- wherein the processing surface includes multiple processing regions,
- the vapor discharge opening includes multiple vapor discharge openings, and one or more vapor discharge openings are provided for each of the multiple processing regions, and
- the vapor ejection controller adjusts the ejection of the water vapor from the multiple vapor discharge openings for each of the multiple processing regions.

6. The substrate liquid processing apparatus of claim 5,
- wherein the liquid flow path includes multiple division flow paths respectively corresponding to the multiple processing regions, and
- the vapor ejection controller controls the flow rate control valve to adjust the supply amount of the pure water into each of the multiple division flow paths.

7. The substrate liquid processing apparatus of claim 5,
- wherein the heater includes multiple division heater sections respectively corresponding to the multiple processing regions, and
- the vapor ejection controller controls the heater to adjust heat generation of each of the multiple division heater sections.

8. The substrate liquid processing apparatus of claim 1, further comprising:
- a gas supply connected to the liquid flow path, and configured to supply a gas into the liquid flow path.

9. A substrate liquid processing method, comprising:

supplying a plating liquid on a processing surface of a substrate; and heating the plating liquid on the processing surface by a heating element having a cover body, a heater, a liquid flow path provided horizontally within the cover body, and a vapor discharge opening which extends vertically from the liquid flow path in a vertical direction of the cover body, wherein in the heating of the plating liquid, water vapor, which is produced as pure water flown into the liquid flow path is vaporized by heat from the heater and is then ejected from the vapor discharge opening, is used to heat the plating liquid on the processing surface, wherein the cover body is configured to cover the processing surface, and the vapor discharge opening of the cover body ejects the water vapor into a gap between the processing surface and the cover body.

10. A substrate liquid processing method, comprising:

heating a substrate by a heating element having a cover body, a heater, a liquid flow path provided horizontally within the cover body, and a vapor discharge opening which extends vertically from the liquid flow path in a vertical direction of the cover body, wherein water vapor, which is produced as pure water flown into the liquid flow path is vaporized by heat from the heater and is then ejected from the vapor discharge opening, is used to heat the substrate; and supplying a plating liquid on a processing surface of the substrate heated by using the water vapor, wherein the cover body is configured to cover the processing surface, and the vapor discharge opening of the cover body ejects the water vapor into a gap between the processing surface and the cover body.

11. A substrate liquid processing method, comprising:

supplying a heating medium liquid on a substrate;

heating a substrate through the heating medium liquid on the substrate by a heating element having a cover body, a heater, a liquid flow path provided horizontally within the cover body, and a vapor discharge opening which extends vertically from the liquid flow path in a vertical direction of the cover body; and supplying a plating liquid on a processing surface of the substrate heated through the heating medium liquid, wherein in the heating of the substrate, water vapor, which is produced as pure water flown into the liquid flow path is vaporized by heat from the heater and is then ejected from the vapor discharge opening, is used to heat the heating medium liquid on the substrate to thereby heat the substrate, wherein the cover body is configured to cover the processing surface, and the vapor discharge opening of the cover body ejects the water vapor into a gap between the processing surface and the cover body.

* * * * *